United States Patent
Ching et al.

(10) Patent No.: US 11,122,650 B2
(45) Date of Patent: Sep. 14, 2021

(54) MULTI POLYMER POSITIVE TEMPERATURE COEFFICIENT HEATER

(71) Applicant: Goodrich Corporation, Charlotte, NC (US)

(72) Inventors: Nathaniel Ching, Hartville, OH (US); Jin Hu, Hudson, OH (US); Casey Slane, Tallmadge, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 550 days.

(21) Appl. No.: 16/032,793

(22) Filed: Jul. 11, 2018

(65) Prior Publication Data

US 2020/0022224 A1    Jan. 16, 2020

(51) Int. Cl.
*H05B 3/14* (2006.01)
*B32B 3/18* (2006.01)

(52) U.S. Cl.
CPC .............. *H05B 3/146* (2013.01); *H05B 3/145* (2013.01); *B32B 3/18* (2013.01); *B32B 2307/202* (2013.01); *B32B 2307/204* (2013.01); *B32B 2457/00* (2013.01); *H05B 2203/002* (2013.01); *H05B 2203/02* (2013.01)

(58) Field of Classification Search
CPC .... H05B 3/22; H05B 3/845; H05B 2203/026; H05B 2203/02; H05B 2203/0002; H05B 2203/011; H05B 3/141; H05B 3/42; H05B 2203/017; H05B 3/0014; H05B 1/0238; H05B 1/0272; H05B 3/12; H05B 3/34; H05B 3/342; H05B 2203/006; H05B 2203/013; H05B 2203/029; H05B 3/146; H05B 3/145
See application file for complete search history.

(56) References Cited

U.S. PATENT DOCUMENTS

| | | |
|---|---|---|
| 4,658,121 A | 4/1987 | Horsma et al. |
| 4,841,127 A | 6/1989 | Prager et al. |
| 8,466,392 B2 | 6/2013 | O'Connor |
| 8,481,898 B2 | 7/2013 | Parker |
| 9,210,739 B2 | 12/2015 | Chabach et al. |
| 9,363,851 B2 | 6/2016 | Ihle et al. |
| 9,736,888 B2 | 8/2017 | Duce et al. |
| 9,939,087 B2 | 4/2018 | Kolarski et al. |

(Continued)

FOREIGN PATENT DOCUMENTS

| | | |
|---|---|---|
| EP | 0385235 A1 | 9/1990 |
| WO | WO94/06128 A1 | 3/1994 |
| WO | WO2017/147480 A1 | 8/2017 |

OTHER PUBLICATIONS

Extended European Search Report for EP Application No. 19185600.4, dated Nov. 7, 2019, 8 pages.

*Primary Examiner* — Phuong T Nguyen
(74) *Attorney, Agent, or Firm* — Kinney & Lange, P.A.

(57) ABSTRACT

A heating element includes a first bus bar disposed to receive current from a power source, and a second bus bar non-adjacent to the first bus bar. The heating element further includes a polymer ink section extending between the first and second bus bars, and the section includes a plurality of PTC polymer inks each different from one another. The second bus bar is electrically connected to the first bus bar via the polymer ink section.

12 Claims, 3 Drawing Sheets

(56) References Cited

U.S. PATENT DOCUMENTS

2011/0297665 A1* 12/2011 Parker ................... H05B 3/22
  219/494
2017/0158898 A1   6/2017 Xiao et al.
2017/0327707 A1   11/2017 Xiao et al.

* cited by examiner

MULTI POLYMER POSITIVE TEMPERATURE COEFFICIENT HEATER

BACKGROUND

Positive Temperature Coefficient (PTC) materials are those exhibiting a positive change in resistance (Ω) in response to an increase in temperature, often prompted by an applied voltage to the PTC material. PTC materials are desirable in heating applications due to this ability to self-regulate current flow, which reduces the risk of overheating. Some PTC heating elements are made with carbon-loaded polymer inks, however, the number of commercially available inks is limited. Some commercially available inks are made with low temperature polymers having low transition temperatures, but also exhibiting Negative Temperature Coefficient (NTC) behavior (i.e., a decrease in resistance with an increase in temperature) beyond an upper threshold temperature. Other inks include high temperature polymers that are stable at higher temperatures, but that have higher transition temperatures. Thus, the need exists for a PTC heating element having the desired properties of both low temperature and high temperature polymer inks.

SUMMARY

A heating element includes a first bus bar disposed to receive current from a power source, and a second bus bar non-adjacent to the first bus bar. The heating element further includes a polymer ink section extending between the first and second bus bars, and the section includes a plurality of PTC polymer inks each different from one another. The second bus bar is electrically connected to the first bus bar via the polymer ink section.

A method of extending operation of a self-regulating heating element over a greater temperature range includes disposing a polymeric ink section between a first bus bar and a second bus bar. The polymeric ink section includes a plurality of PTC polymer inks each different from one another.

DETAILED DESCRIPTION

The present invention is directed to a heating element, and more specifically, to a heating element formed from multiple PTC polymer inks. Two or more PTC polymer inks can be arranged as individual sheets in series or in parallel, and the combination of inks can result in a heating element having desired resistive properties. An alternative embodiment can also include two or more inks mixed together in a single sheet or layer.

Figure 1:
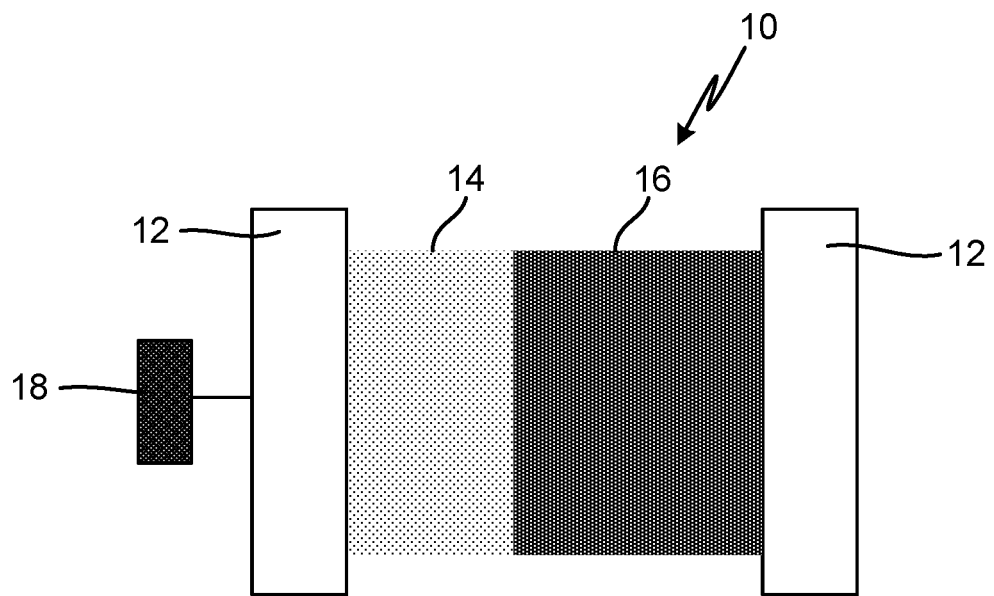
FIG. 1 is a simplified view of a PTC heating element.
Figure 2:
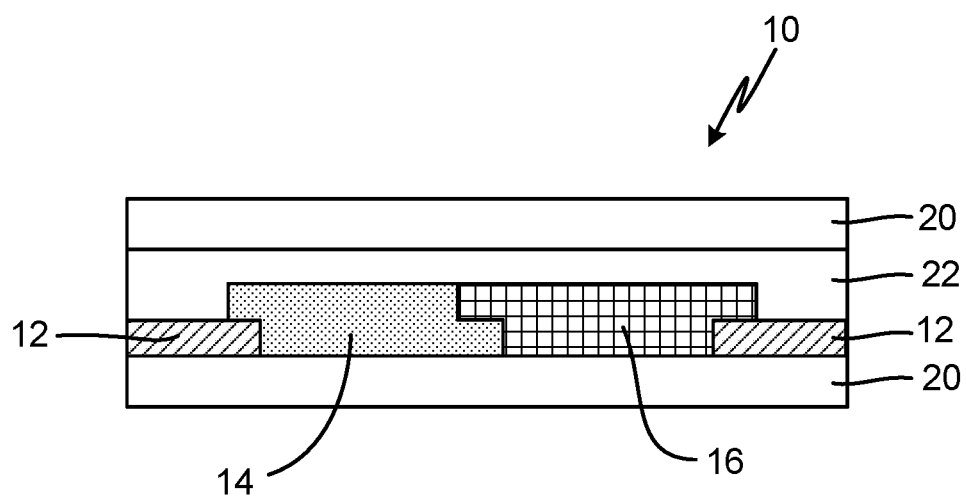
FIG. 2 is a cross-sectional view of the PTC heating element showing additional layers.

FIG. 1 is a simplified view of PTC heating element 10. Element 10 includes bus bars 12, first polymer ink 14, second polymer ink 16, and power source 18. FIG. 2 is a cross-sectional view of element 10 showing bus bars 12, first polymer ink 14, and second polymer ink 16, as well as dielectric layers 20, and adhesive layer 22, which provide additional support to element 10.

Bus bars 12 are arranged to electrically connect power source 18 with polymer inks 14 and 16. Bus bars 12 can be formed from a conductive silver-loaded ink, however, other appropriately conductive inks, metals, and/or alloys (e.g., copper) are contemplated herein. As is shown in FIGS. 1 and 2, bus bars 12 have a generally rectangular shape, but in an alternative embodiment, can include other shapes, such as curved, or an interdigitated (comb) shape having finger-like projections. An alternative embodiment can further include a third bus bar 12 disposed, for example, between polymer inks 14 and 16. Alternative materials and/or design choices can be based upon factors such as the size and shape of the area to be heated, chemical compatibility, or the available power supply.

Polymer inks 14 and 16 can be commercially available conductive PTC inks (e.g., Loctite® ECI 8000 Series inks or DuPont 7292) formed from one or more polymer materials and loaded with a carbon filler material. As is represented in FIGS. 1 and 2, polymer inks 14 and 16 are different inks having different thermal and/or resistive properties. For example, polymer ink 14 can be a relatively low temperature ink, such that it has a lower transition temperature (i.e., the temperature at which the resistance starts to increase rapidly) and/or a lower upper temperature limit (i.e., the temperature at which the material exhibits NTC or other undesirable behaviors), when compared to polymer ink 16. The converse can also be true. Further, although it appears in FIG. 1 that polymer ink 14 occupies a smaller area than polymer ink 16, the amount of either ink used can vary from embodiment to embodiment depending on the desired properties of the combined inks, as is discussed in greater detail below.

As is shown in FIGS. 1 and 2, polymer inks 14 and 16 are arranged as individual sheets/layers disposed between bus bars 12 in an electrical series relationship. In this arrangement, if the layer of polymer ink 14 has a resistance $R_1$ and the layer of polymer ink 16 has a resistance $R_2$, the total resistance ($R_T$) of element 10 equals the sum of the resistances each individual polymer ink layer, such that $R_T = R_1 + R_2$. By combining the layers of polymer inks 14 and 16 having selected individual resistive properties in this manner, element 10 can self-regulate/operate effectively over a wider temperature range than either ink individually. For example, a transition temperature of element 10 can be between 50-65° C. while an upper temperature threshold can exceed 100° C. Other operating ranges are contemplated herein.

Referring to FIG. 2, bus bars 12, polymer inks/layers 14 and 16 are disposed between dielectric layer 20 and adhesive layer 22. A second dielectric layer 20 is disposed on a side of adhesive layer opposite bus bars 12, polymer inks/layers 14 and 16. Each dielectric layer 20 can be formed from a polymer material, and can be arranged as a film, or one or more sheets or plies. An exemplary polymer can include a polyimide, such as Kapton®, because of its dielectric and non-flammable properties. Other suitable polymers having robust dielectric, mechanical, and thermal properties are contemplated herein. Adhesive layer 22 can help secure the other components of heating element 10, and can be formed generally from a thermally conductive, commercially available adhesive.

In order to make heating element, polymer inks 14 and 16 can be directly printed onto dielectric layer 20 (or other substrate) using, for example, a screen printing technique, or a direct writing technique. Similarly, bus bars 12 can be printed/applied directly onto dielectric layer 20, or can be formed separately and bonded/adhered to dielectric layer 20. Adhesive layer 22 and a second dielectric layer 20, if desired, can then be applied to/placed over lower layers. Alternative or additional layers can also be included, depending on the location of heating element 10.

Figure 3:
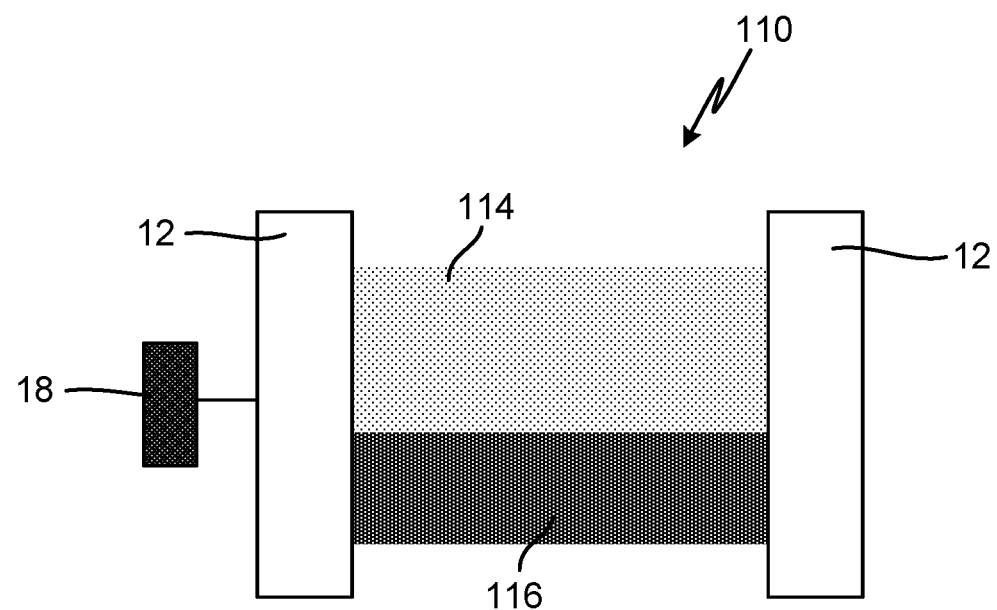
FIG. 3 is a simplified view of an alternative PTC heating element.

FIG. 3 is a simplified view of alternative heating element 110, which is similar to heating element 10 in that it employs bus bars 12 and power source 18 in generally the same manner. As shown, heating element 110 includes polymer inks 114 and 116, which are similar to polymer inks 14 and 16, as discussed above, except that they are arranged as layers in a parallel relationship. In this sense, the total resistance ($R_T$) of element 110 is calculated based on the sum of each polymer ink layer, such that $1/R_T=1/R_1+1/R_2$. Due to this relationship, the total resistance $R_T$ will always be less than that of any individual resistor, and $R_T$ will decrease with each additional polymer ink layer added in this manner to element 110. Such an embodiment can be useful, for example, in certain heating applications for which one of the commercially available PTC inks has a resistance that is too high for such applications.

Figure 4:
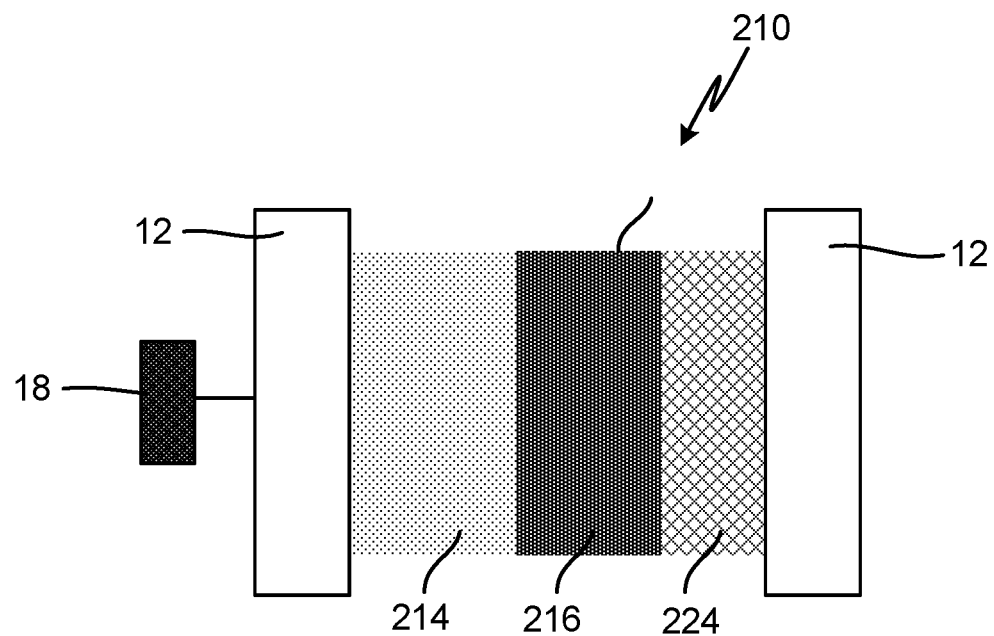
FIG. 4 is a simplified view of a second alternative PTC heating element.

FIG. 4 is a simplified view of second alternative heating element 210, which is similar to element 10, except that it includes three polymer inks—214, 216, 224—arranged as layers in series. Third polymer ink 224 can be any of the commercially available inks discussed above with respect to element 10, and has different properties than either polymer ink 214 or 216. The addition of polymer ink 224 can help further customize the operating range of element 210. Alternative embodiments can further include a parallel arrangement and/or more than three polymer inks arranged in series or parallel.

Figure 5:
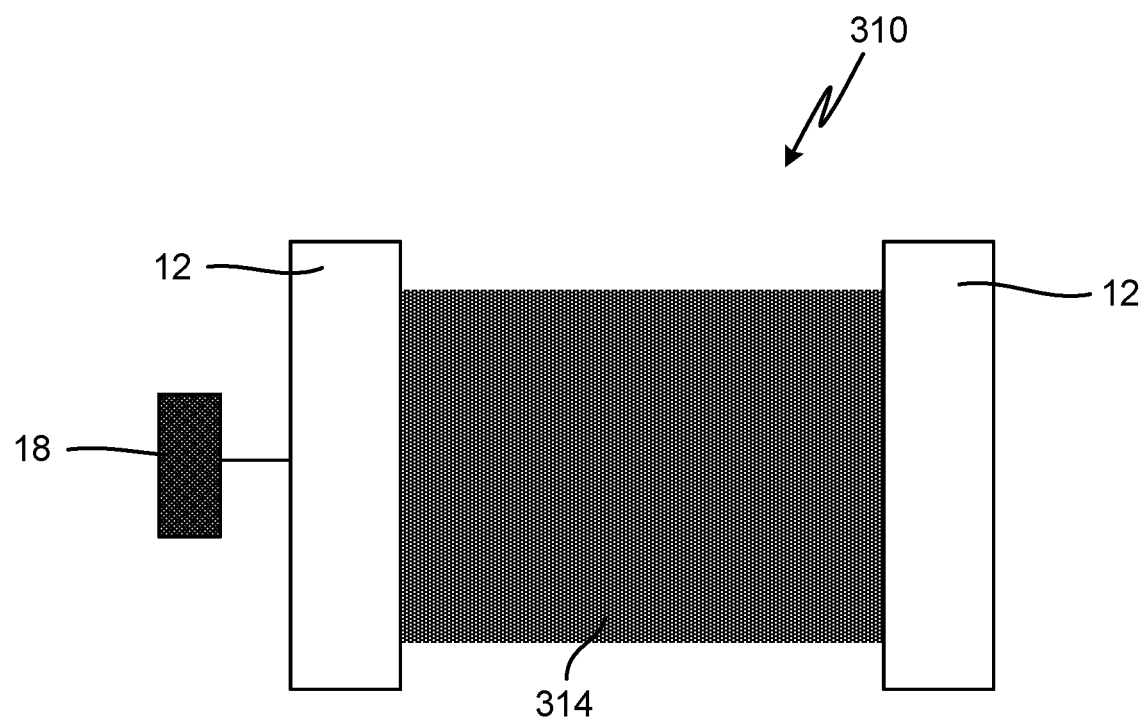
FIG. 5 is a simplified view of a third alternative PTC heating element.

FIG. 5 is a simplified view of third alternative heating element 310, which is similar to element 10, except that it includes hybrid polymer ink 314. Hybrid polymer ink 314 can be formed from two or more of the commercially available inks discussed above. The two or more inks can be mixed together in the desired proportions, then printed or otherwise applied to a substrate, as was discussed above with respect to element 10. Like the embodiments above, hybrid polymer ink 314 embodies the combined properties of its individual ink components, which can provide element 310 a wider or more targeted operating range. In alternative embodiments, hybrid polymer ink 314 can be arranged in series or parallel with one or more homogenous or heterogeneous polymer inks or mixtures, whenever useful for achieving very specific operating ranges.

It is further possible for any of the disclosed embodiments to be combined in some manner. For example, an alternative embodiment can include combinations of polymer ink layers arranged in both series and in parallel. Further, each polymer ink layer can be formed from a single ink, or a mixture of inks, as discussed above.

The disclosed heating elements have many benefits. First, each can be tailored for specific heating applications by varying the combination and/or arrangement of the polymer inks. The printing of the inks and other components further allows for elements having complex geometries. The disclosed elements can be used in aerospace heating applications (e.g., heated floor panels and electro-thermal ice protection), as well as household/consumer applications (e.g., area heating, heated blankets, water tank heating, etc.).

Discussion of Possible Embodiments

The following are non-exclusive descriptions of possible embodiments of the present invention.

A heating element includes a first bus bar disposed to receive current from a power source, and a second bus bar non-adjacent to the first bus bar. The heating element further includes a polymer ink section extending between the first and second bus bars, and the section includes a plurality of PTC polymer inks each different from one another. The second bus bar is electrically connected to the first bus bar via the polymer ink section.

The heating element of the preceding paragraph can optionally include, additionally and/or alternatively, any one or more of the following features, configurations and/or additional components:

In the above elements, the plurality of PTC polymer inks can include a first PTC polymer ink having a first transition temperature, and a second PTC polymer ink having a second transition temperature higher than the first transition temperature.

In any of the above elements, a heating element transition temperature can be lower than one of the first or second transition temperatures.

In any of the above elements, the heating element transition temperature can be between 50° C. and 65° C.

In any of the above heating elements, the heating element can have and upper temperature threshold, and the heating element transition temperature and the upper temperature threshold can define an operating range of the heating element.

In any of the above elements, the operating range of the heating element can be greater than an operating range of the first or second PTC polymer inks.

In any of the above elements, the first and second PTC polymer inks can include a carbon filler material.

In any of the above elements, the first and second PTC polymer inks can be arranged as adjacent first and second layers.

In any of the above elements, the first and second layers can be arranged in series.

In any of the above elements, the first and second layers can be arranged in parallel.

Any of the above elements can further include a third PTC polymer ink adjacent the first or second PTC polymer ink, and the third PTC polymer ink can have a third transition temperature different from the first or second transition temperatures.

In any of the above elements, the first and second PTC polymer inks can be arranged as a hybrid mixture, and the hybrid mixture can be arranged as a layer.

In any of the above elements, the first PTC polymer ink can include a first polymer material and a first carbon filler material.

In any of the above elements, the second PTC polymer ink can include a second polymer material and a second carbon filler material, and the second polymer material and the second carbon material can be different from the first polymer material and the first carbon filler material.

In any of the above elements, the hybrid mixture can have a first transition temperature, the first PTC polymer ink can have a second transition temperature, and the second PTC polymer ink can have a third transition temperature.

In any of the above elements, the first transition temperature can be lower than one of the second or third transition temperatures.

In any of the above elements, the hybrid mixture can further include a third PTC polymer ink different from the first and second PTC polymer inks.

A method of extending operation of a self-regulating heating element over a greater temperature range includes disposing a polymeric ink section between a first bus bar and a second bus bar. The polymeric ink section includes a plurality of PTC polymer inks each different from one another.

The method of the preceding paragraph can optionally include, additionally and/or alternatively, any one or more of the following features, configurations and/or additional components:

In the above method, the plurality of PTC polymer inks can include a first PTC polymer ink arranged as a first layer, and a second PTC polymer ink arranges as a second layer.

Any of the above methods can further include: arranging the first and second layers in series.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heating element comprising:
a first bus bar disposed to receive current from a power source;
a second bus bar spaced apart from the first bus bar; and
a polymer ink section extending between the first and second bus bars, the section comprising:
a first PTC polymer ink arranged as a first layer and in physical contact with at least the first bus bar; and
a second PTC polymer ink arranged as a second layer in physical contact with the first layer and at least the second bus bar;
wherein the first PTC polymer ink has different thermal properties than the second PTC polymer ink;
wherein the second bus bar is electrically connected to the first bus bar via the polymer ink section.

2. The heating element of claim 1, wherein the first PTC polymer ink has a first transition temperature, and the second PTC polymer ink has a second transition temperature higher than the first transition temperature.

3. The heating element of claim 2, wherein a heating element transition temperature is lower than one of the first or second transition temperatures.

4. The heating element of claim 3, wherein the heating element transition temperature is between 50° C. and 65° C.

5. The heating element of claim 3, wherein the heating element has an upper temperature threshold, and wherein the heating element transition temperature and the upper temperature threshold define an operating range of the heating element.

6. The heating element of claim 5, wherein the operating range of the heating element is greater than an operating range of the first or second PTC polymer inks.

7. The heating element of claim 2 and further comprising: a third PTC polymer ink in physical contact with at least one of the first or second PTC polymer inks, wherein the third PTC polymer ink has a third transition temperature different from the first or second transition temperatures.

8. The heating element of claim 1, wherein the first and second PTC polymer inks comprise a carbon filler material.

9. The heating element of claim 1, wherein the first and second layers are arranged in series.

10. The heating element of claim 1, wherein the first and second layers are arranged in parallel.

11. A method of extending operation of a self-regulating heating element over a greater temperature range, the method comprising:
disposing a polymer ink section between a first bus bar and a spaced apart second bus bar, the polymer ink section comprising:
a first PTC polymer ink arranged as a first layer and in physical contact with at least the first bus bar; and
a second PTC polymer ink arranged as a second layer in physical contact with the first layer and at least the second bus bar;
wherein the first PTC polymer ink has different thermal properties than the second PTC polymer ink; and
electrically connecting the second bus bar to the first bus bar via the polymer ink section.

12. The method of claim 11 and further comprising one of: arranging the first and second layers in series, and arranging the first and second layers in parallel.

* * * * *